United States Patent
Jeon et al.

(10) Patent No.: US 7,654,620 B2
(45) Date of Patent: Feb. 2, 2010

(54) METHOD FOR CONTROL REGENERATIVE BRAKING OF ELECTRIC VEHICLE

(75) Inventors: Gab Bae Jeon, Gunpo-si (KR); Byeong Cheol Yang, Daegu (KR)

(73) Assignee: Hyundai Motor Company, Seoul (KR)

( * ) Notice: Subject to any disclaimer, the term of this patent is extended or adjusted under 35 U.S.C. 154(b) by 293 days.

(21) Appl. No.: 11/648,765

(22) Filed: Dec. 29, 2006

(65) Prior Publication Data

US 2008/0100132 A1    May 1, 2008

(30) Foreign Application Priority Data

Oct. 26, 2006   (KR) ...................... 10-2006-0104302
Oct. 26, 2006   (KR) ...................... 10-2006-0104304

(51) Int. Cl.
*B60T 8/64* (2006.01)

(52) U.S. Cl. .......................... 303/152; 303/138; 701/70

(58) Field of Classification Search .................. 303/152, 303/3, 15, 150, 155, 138; 701/70, 71
See application file for complete search history.

(56) References Cited

U.S. PATENT DOCUMENTS 6,709,075 B1 *   3/2004   Crombez et al. ............ 303/152

* cited by examiner

*Primary Examiner*—Melanie Torres
(74) *Attorney, Agent, or Firm*—Morgan, Lewis, & Bockius LLP

(57) ABSTRACT

A method for controlling regenerative braking of a vehicle includes: initiating the regenerative braking; detecting an amount of slip of a wheel during the regenerative braking; if the amount of slip is increasing, reducing a regenerative braking torque; and if the amount of slip is greater than a set value, actuating an antilock brake system and reducing the regenerative braking torque or a hydraulic braking torque continuously until the vehicle is stopped. Alternatively, if the amount of slip is increasing, the regenerative braking torque is not reduced.

2 Claims, 4 Drawing Sheets

METHOD FOR CONTROL REGENERATIVE BRAKING OF ELECTRIC VEHICLE

CROSS-REFERENCE TO RELATED APPLICATIONS

This application claims priorities to and benefit of Korean Patent application Nos. 10-2006-0104302 and 10-2006-0104304, both filed on Oct. 26, 2006, in the Korean Intellectual Property Office, the disclosure of which is incorporated herein by reference.

BACKGROUND OF THE INVENTION

1. Field of the Invention

The present invention relates to a method for controlling regenerative braking of an electric vehicle, and more particularly to a method for controlling regenerative braking of an electric vehicle that reduces regenerated braking torque gradually.

2. Description of the Related Art

Generally, an electric vehicle uses regenerative braking. Sometimes sufficient braking can not be obtained with only regenerative braking. An electric vehicle thus also contains a hydraulic brake system to elicit braking force by oil pressure US patent published No. 2002/018266 discloses a braking force control system in the beginning of ABS control during regenerative braking. The regenerative braking torque is decreased progressively and when ABS control has begun, the regenerative braking is turned off, then the necessary braking torque is controlled by hydraulic pressure.

During regenerative braking, when reducing the regenerative braking torque before beginning the ABS activation, energy recovery is decreased. Furthermore, when the regenerative braking is turned off, the actual braking force is lower than the goal braking force.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a method for controlling regenerative braking of an electric vehicle. During the regenerative braking, the regenerative braking torque is reduced progressively before and during ABS control.

An exemplary method for controlling regenerative braking includes beginning regenerative braking; detecting an amount of slip of a front wheel; reducing the regenerative braking torque if the amount of slip is increasing before an ABS is actuated; and continuing to reduce the regenerative braking torque during the ABS actuating if the amount of slip is larger than a standard value.

If regenerative braking torque is insufficient during the ABS activation, hydraulic torque may be used.

Further, after actuating the ABS, if the necessary reduction amount of braking torque is more than the reduction amount of the regenerative braking torque, the hydraulic braking torque is decreased.

An alternative method includes: beginning regenerative braking of the electric vehicle; detecting a front wheel slip amount during the regenerative braking; if the front wheel slip amount is above a standard value, actuating the ABS and continuously decreasing the regenerative braking torque until the vehicle is stopped; and if the front wheel slip amount is increasing before actuating the ABS, not decreasing the regenerative braking amount.

BRIEF DESCRIPTION OF THE DRAWINGS

These and other aspects of the invention will become apparent and more readily appreciated from the following description of the preferred embodiments, taken in conjunction with the accompanying drawings, in which.

DETAILED DESCRIPTION OF THE PREFERRED EMBODIMENTS

Hereinafter, a method for controlling regenerative braking of electric vehicle according to embodiments of the present invention will be described with reference to the drawings.

Figure 1:
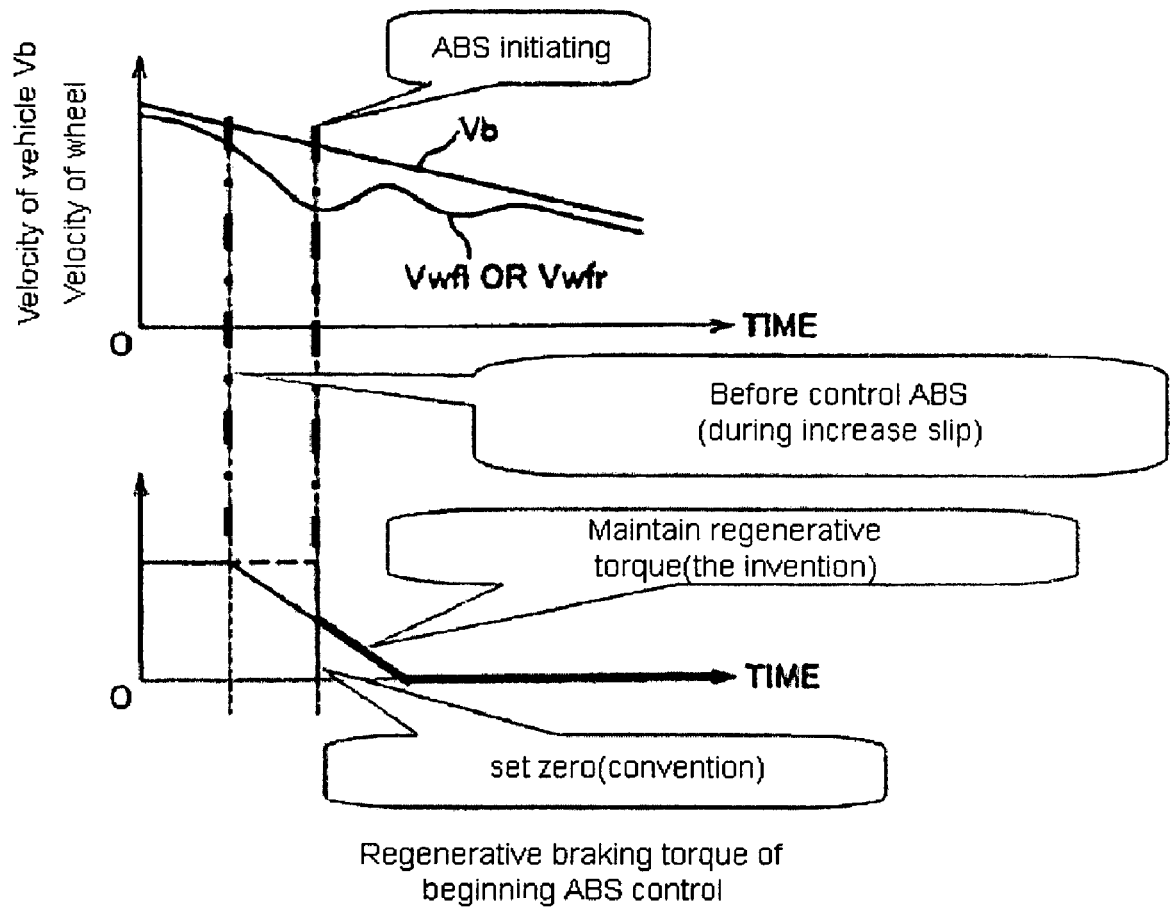
FIG. 1 illustrates a method for controlling regenerative braking according to a first exemplary embodiment of the present invention.
Figure 4:
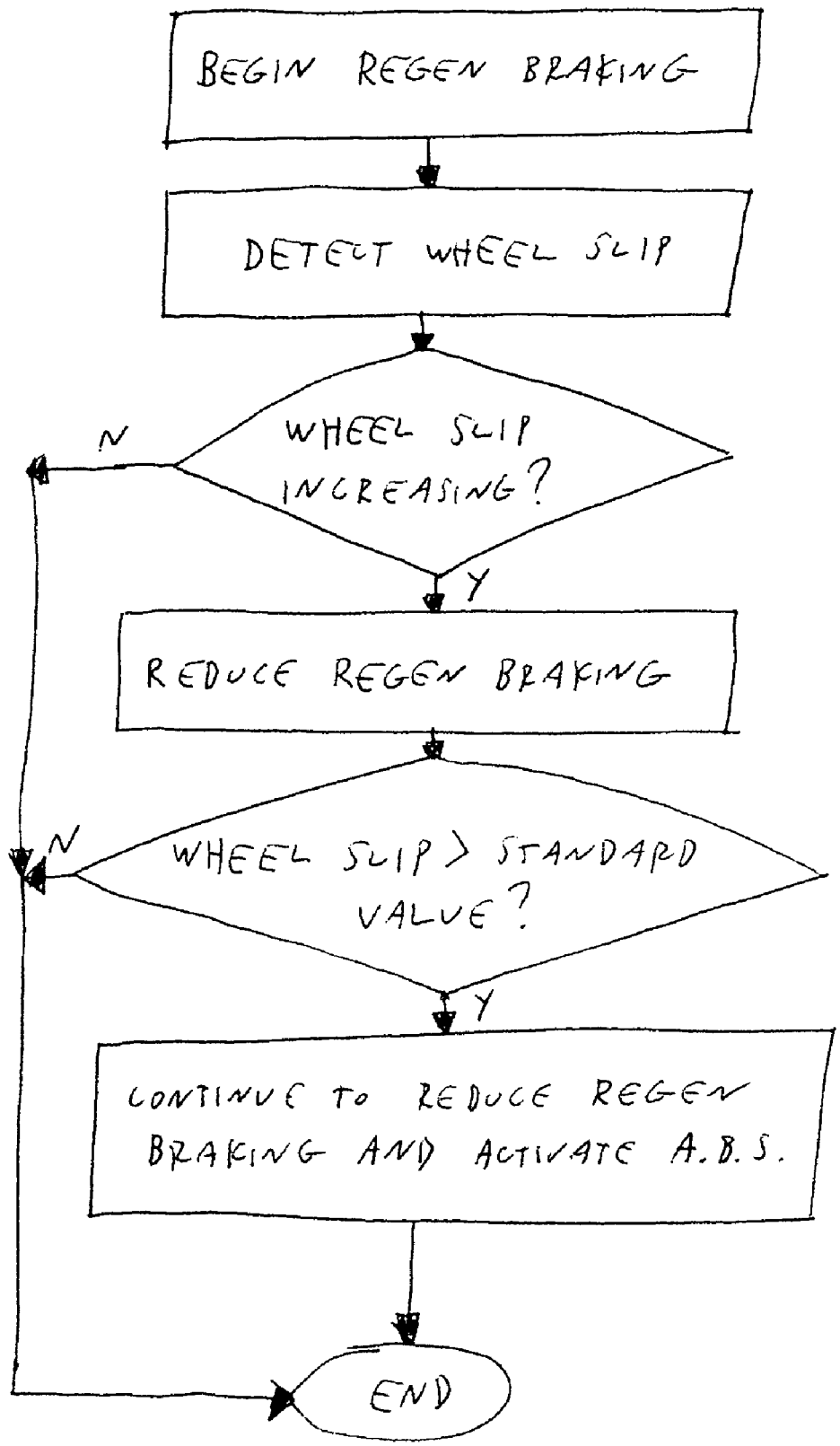
FIG. 4 is a flowchart illustrating a method for controlling regenerative braking according to the first embodiment of the present invention.

Referring to FIGS. 1 and 4, in a first exemplary embodiment, the present invention controls regenerative braking torque at the beginning of ABS control, to promote energy recovery while reducing the regenerative braking torque gradually if the slip amount of a wheel is increasing before the initiation of ABS actuating.

The regenerative braking torque is reduced until the vehicle stops during ABS actuating if the slip amount of a front wheel is larger than a standard value, improving the feeling of braking and energy recovery.

Hydraulic braking is also used during the ABS actuating.

Figure 2:
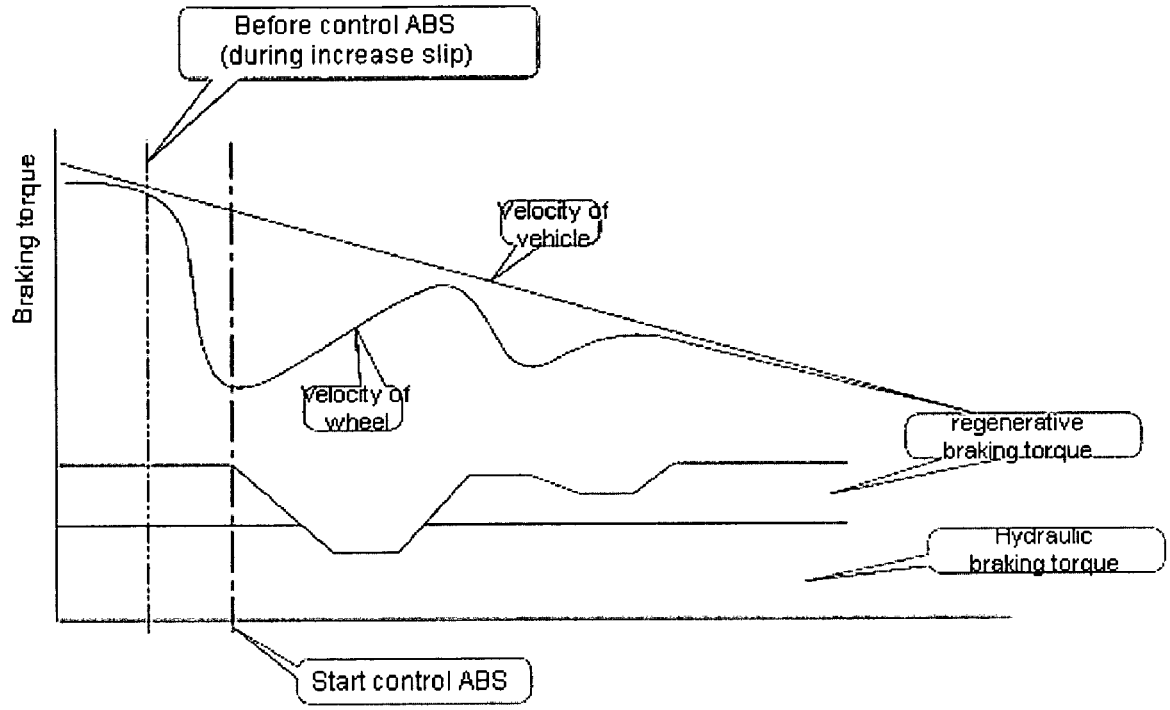
FIG. 2 illustrates a method for controlling regenerative braking according to a second exemplary embodiment of the present invention.
Figure 5:
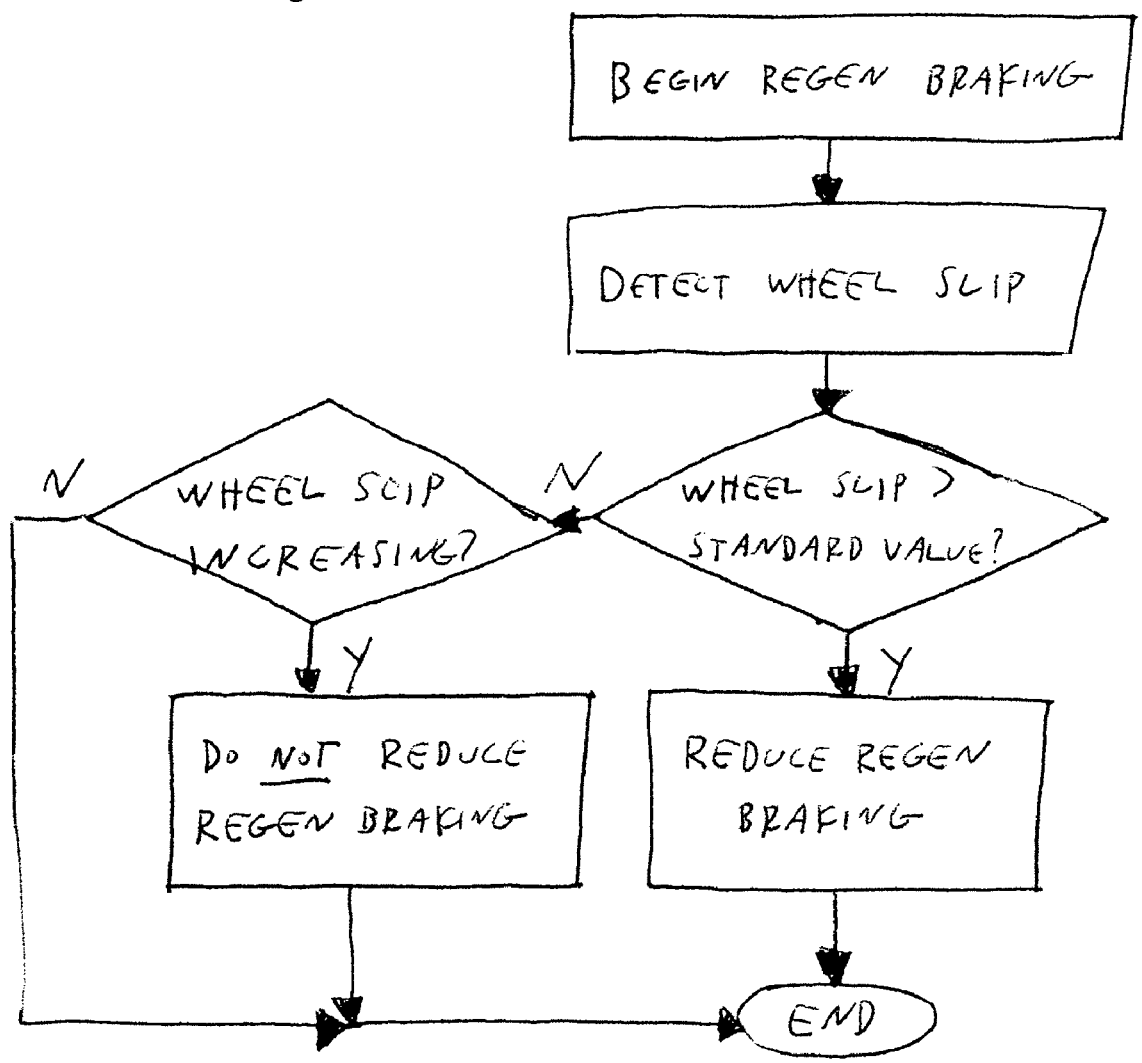
FIG. 5 is a flowchart illustrating a method for controlling regenerative braking according to the second and third embodiments of the present invention.

Referring to FIGS. 2 and 5, in a second embodiment, if the slip amount is increased before actuating the ABS, the actuating signal is transferred to the motor by the controller of the regenerative braking and the regenerative braking torque is not reduced.

Here, if the amount of front wheel slip is larger than the standard value, at the same time of initiating the ABS actuating, the regenerative braking torque is reduced until vehicle stop.

Meanwhile, the hydraulic braking torque is reduced when the needed decrement of braking torque is larger than the decrement of the regenerative braking torque.

Figure 3:
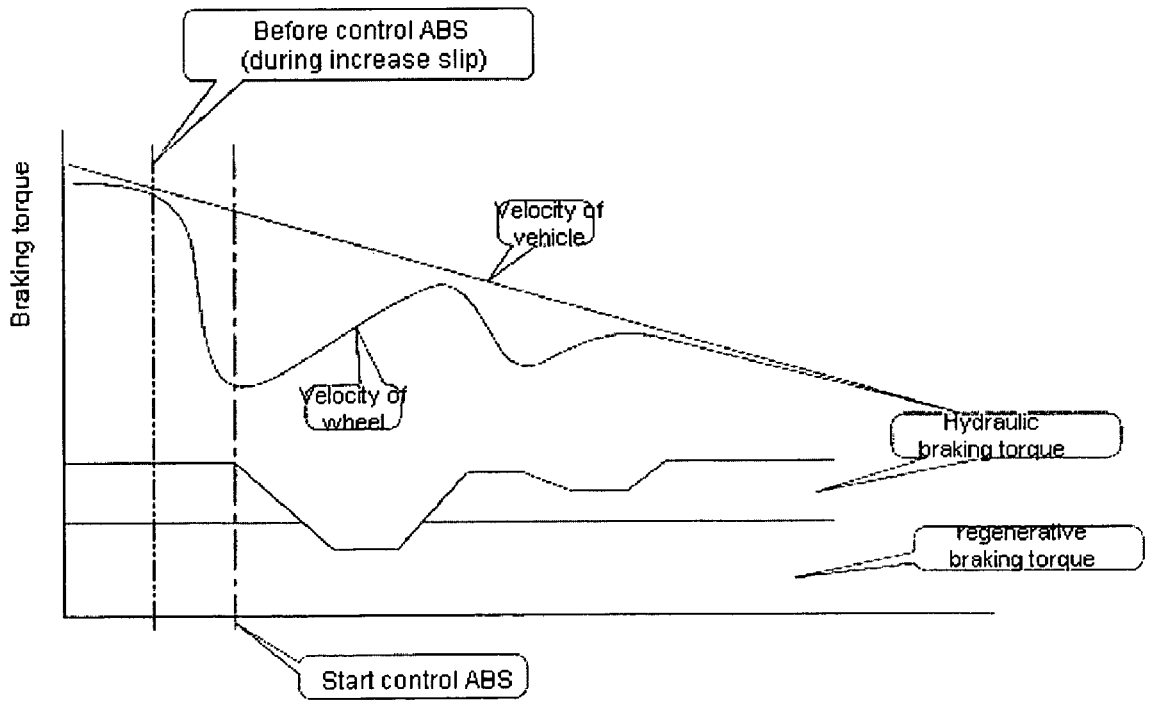
FIG. 3 illustrates a method for controlling regenerative braking according to a third exemplary embodiment of the present invention.

Referring to FIG. 3, a third exemplary embodiment differs from the second embodiment in that the needed decrement of braking torque is primarily reduced from the hydraulic braking torque, without reducing the regenerative braking torque, and the regenerative braking torque is reduced when the needed decrement of braking torque is larger than the decrement of hydraulic braking torque.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling regenerative braking of a vehicle, comprising:
   initiating the regenerative braking;
   detecting an amount of slip of a wheel during the regenerative braking;
   if the amount of slip is increasing, not reducing a regenerative braking torque; and
   if the amount of slip is greater than a set value, actuating an antilock brake system and reducing a hydraulic braking torque continuously until the vehicle is stopped.

2. The method of claim 1, wherein the regenerative braking torque is reduced if a needed reducing amount of braking torque is larger than a reducing amount of the hydraulic braking torque.

* * * * *